(12) United States Patent
French et al.

(10) Patent No.: US 12,242,089 B2
(45) Date of Patent: Mar. 4, 2025

(54) COLOR FILTER MODULE

(71) Applicant: E Ink Holdings Inc., Hsinchu (TW)

(72) Inventors: Ian French, Hsinchu (TW); Po-Yuan Lo, Hsinchu (TW); Liang-Yu Lin, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 426 days.

(21) Appl. No.: 17/579,557

(22) Filed: Jan. 19, 2022

(65) Prior Publication Data

US 2022/0317348 A1    Oct. 6, 2022

(30) Foreign Application Priority Data

Apr. 1, 2021   (TW) .................................. 110112040

(51) Int. Cl.
*G02B 5/20* (2006.01)
*G02F 1/1677* (2019.01)

(52) U.S. Cl.
CPC ........... *G02B 5/201* (2013.01); *G02F 1/1677* (2019.01)

(58) Field of Classification Search
CPC ........ G02B 5/201; G02F 1/1677; G02F 1/167
See application file for complete search history.

(56) References Cited

U.S. PATENT DOCUMENTS

| | | | |
|---|---|---|---|
| 7,561,324 B2 | 7/2009 | Duthaler et al. | |
| 9,250,121 B2 | 2/2016 | Tanaka et al. | |
| 9,355,601 B2 | 5/2016 | Brown Elliott | |
| 9,645,290 B2 | 5/2017 | Kobayashi et al. | |
| 10,599,005 B2 | 3/2020 | Duthaler et al. | |
| 2013/0286465 A1* | 10/2013 | Chen | H01L 27/156 257/89 |
| 2017/0003495 A1* | 1/2017 | De Greef | G02B 26/005 |

FOREIGN PATENT DOCUMENTS

| | | |
|---|---|---|
| CN | 102789086 | 11/2012 |
| CN | 104932137 | 9/2015 |
| CN | 105425502 | 3/2016 |
| JP | 2016062091 | 4/2016 |
| TW | 200905299 | 2/2009 |

OTHER PUBLICATIONS

"Office Action of China Counterpart Application", issued on Jan. 22, 2025, p. 1-p. 6.

* cited by examiner

*Primary Examiner* — Wyatt A Stoffa
*Assistant Examiner* — John Curtis Sipes
(74) *Attorney, Agent, or Firm* — JCIPRNET

(57) ABSTRACT

A color filter module is provided. The color filter module is arranged on a display panel. The color filter module includes a transparent substrate and a color resist layer. The transparent substrate includes multiple sub-pixel regions arranged in an array. The color resist layer is arranged on the transparent substrate. The color resist layer includes multiple color resist units. The color resist units are respectively arranged across at least two sub-pixel regions, and the color resist units form a staggered array on the transparent substrate.

9 Claims, 6 Drawing Sheets

COLOR FILTER MODULE

CROSS-REFERENCE TO RELATED APPLICATION

This application claims the priority benefit of Taiwan application serial no. 110112040, filed on Apr. 1, 2021. The entirety of the above-mentioned patent application is hereby incorporated by reference herein and made a part of this specification.

BACKGROUND

Technical Field

The disclosure relates to a filter module, and particularly relates to a color filter module.

Description of Related Art

E-papers and e-books display contents by exploiting electrophoretic display (EPD) technologies. In the case of e-books displaying black-and-white contents, the display medium in an electrophoretic display mainly includes an electrophoretic liquid as well as black charged particles and white charged particles doped in the electrophoretic liquid. The charged particles are driven to move by applying a voltage. Accordingly, each pixel may respectively display a black color, a white color, or a gray-scale color.

In the conventional technology, most of the electrophoretic displays display contents through reflecting light of an external light source, and the charged particles doped in the electrophoretic liquid and driven by a voltage allow each pixel to display a gray-scale color as required. To make electrophoretic displays more generally applicable, a color filter array (CFA) may also be provided on an electrophoretic display thin film. At this time, the electrophoretic display displays colors mainly by reflecting external light through the color filter array by using the charged particles in the electrophoretic liquid after the external light passes through the color filter array.

In general, a color filter array is formed by multiple filter patterns of different colors. Each of the filter patterns of different colors corresponds to a pixel unit in a driving array substrate. The electrophoretic display absorbs and reflects light by using the white charged particles and the black charged particles, and displays a colored display image by using red, blue, and green filter patterns.

However, the viewing angle of the conventional electrophoretic display is limited. Specifically, when the user views the electrophoretic display from a more inclined angle, the reflected light entering the user's eye may pass through filter patterns of more than one color. As a result, colors in the image viewed by the user may be mixed, which affects the viewing experience.

SUMMARY

The disclosure provides a color filter module capable of reducing a color mixing phenomenon when the user views an electrophoretic display from a more inclined angle.

According to an embodiment of the disclosure, a color filter module is arranged on a display panel. The color filter module includes a transparent substrate and a color resist layer. The transparent substrate includes multiple sub-pixel regions arranged in an array. The color resist layer is arranged on the transparent substrate. The color resist layer includes multiple color resist units. The color resist units are respectively arranged across at least two sub-pixel regions, and the color resist units form a staggered array on the transparent substrate.

Based on the above, the color filter module of the disclosure prevents the image on an electrophoretic display viewed by the user at a more inclined viewing angle from being affected by the color mixing phenomenon. Thus, the electrophoretic display device having the color filter module according to the disclosure is able to provide favorable viewing experiences.

To make the above features and advantages of the disclosure more comprehensible, embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
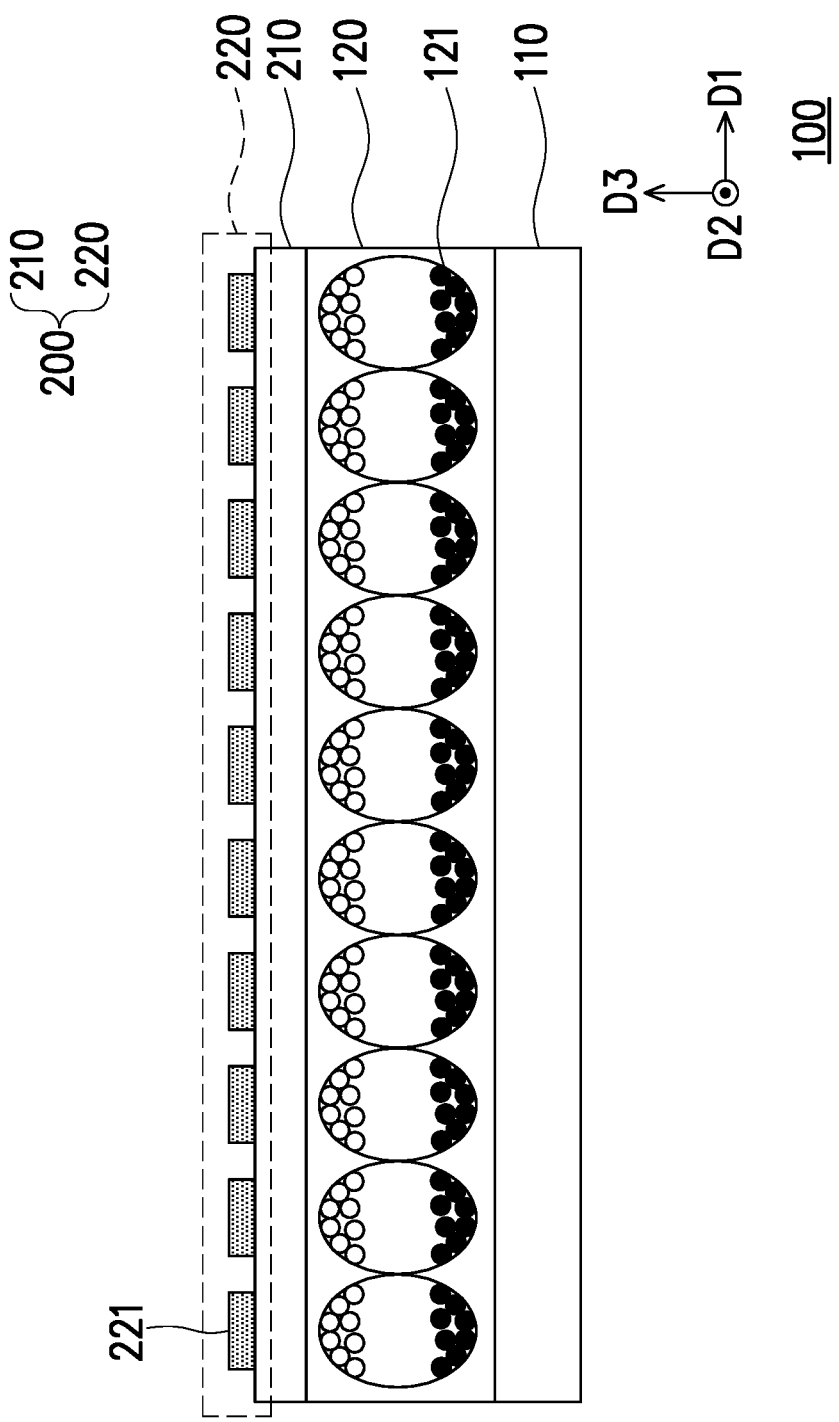
FIG. 1 is a partial cross-sectional view of an electrophoretic display according to an embodiment of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

In order to make the invention more comprehensible, embodiments are described below as the examples to show the disclosure. Moreover, elements/components/steps with same reference numerals represent same or similar parts in the drawings and embodiments.

In addition, unless defined otherwise, all the terms (including technical and scientific terms) used in the disclosure bear the same meanings as those construed by people of ordinary skills in the art. It should be further understood that, terminology defined in commonly-used dictionaries should be interpreted to have the same definitions in related art and in the entire specification of the invention, and are not interpreted as ideal or overly-formal definitions unless clearly stated as such in the present specification.

FIG. 1 is a partial cross-sectional view of an electrophoretic display according to an embodiment of the disclosure. For the convenience of the description, some components are omitted in FIG. 1. In the following, the detailed structure of an electrophoretic display 100 will be described with reference to FIG. 1.

Referring to FIG. 1, the electrophoretic display 100 includes a display driving module 110, a display panel 120, and a color filter module 200. In addition, the display panel 120 may be arranged on the display driving module 110 along a third direction D3. In addition, the color filter module 200 may be arranged on the display panel 120 along the third direction D3. In the embodiment, the color filter module 200 may include a transparent substrate 210 and a color resist layer 220. The color resist layer 220 may be arranged on the transparent substrate 210 along the third direction D3, and the color resist layer 220 includes multiple color resist units 221 arranged into an array along a first direction D1 and a second direction D2. For example, the color resist units 221 may include color resist units 221 of different colors, such as red, green, and blue. The disclosure is not particularly limited in this regard. In addition, the color resist units 221 may be arranged in correspondence with an electrophoretic display medium 121, such as being arranged in a one-to-one, multi-to-one, one-to-multi, or multi-to-multi relationship. The disclosure is not particularly limited in this regard. In this way, the image displayed on the electrophoretic display 100 may exhibit a corresponding color through the color filter module 200. In addition, the brightness value may be adjusted by driving the electrophoretic display medium 121 by using the driving module 110.

In the embodiment, the display driving module 110 may include a thin-film transistor (TFT) array. In addition, the TFT array may include multiple top-gate TFTs or multiple bottom-gate TFTs. However, the disclosure is not particularly limited in this regard. In the embodiment, the display panel 120 may include a reflective electrophoretic display panel. However, the disclosure is not particularly limited in this regard. In the embodiment, the display panel 120 may include multiple electrophoretic media 121. In addition, each electrophoretic display medium 121 may include an electrophoretic liquid, multiple white charged particles, and multiple black charged particles. However, the disclosure is not limited thereto. In the embodiment, the color filter module 200 may include a color filter array (CFA). However, the disclosure is not limited thereto. In the embodiment, the transparent substrate 210 may include a flexible transparent substrate (e.g., a plastic thin film) or a non-flexible transparent substrate (e.g., a glass substrate). However, the disclosure is not limited thereto. In the embodiment, any two of the first direction D1, the second direction D2, and the third direction D3 are perpendicular to each other. Accordingly, the first direction D1, the second direction D2, and the third direction D3 form a three-dimensional coordinate system.

Figure 2A:
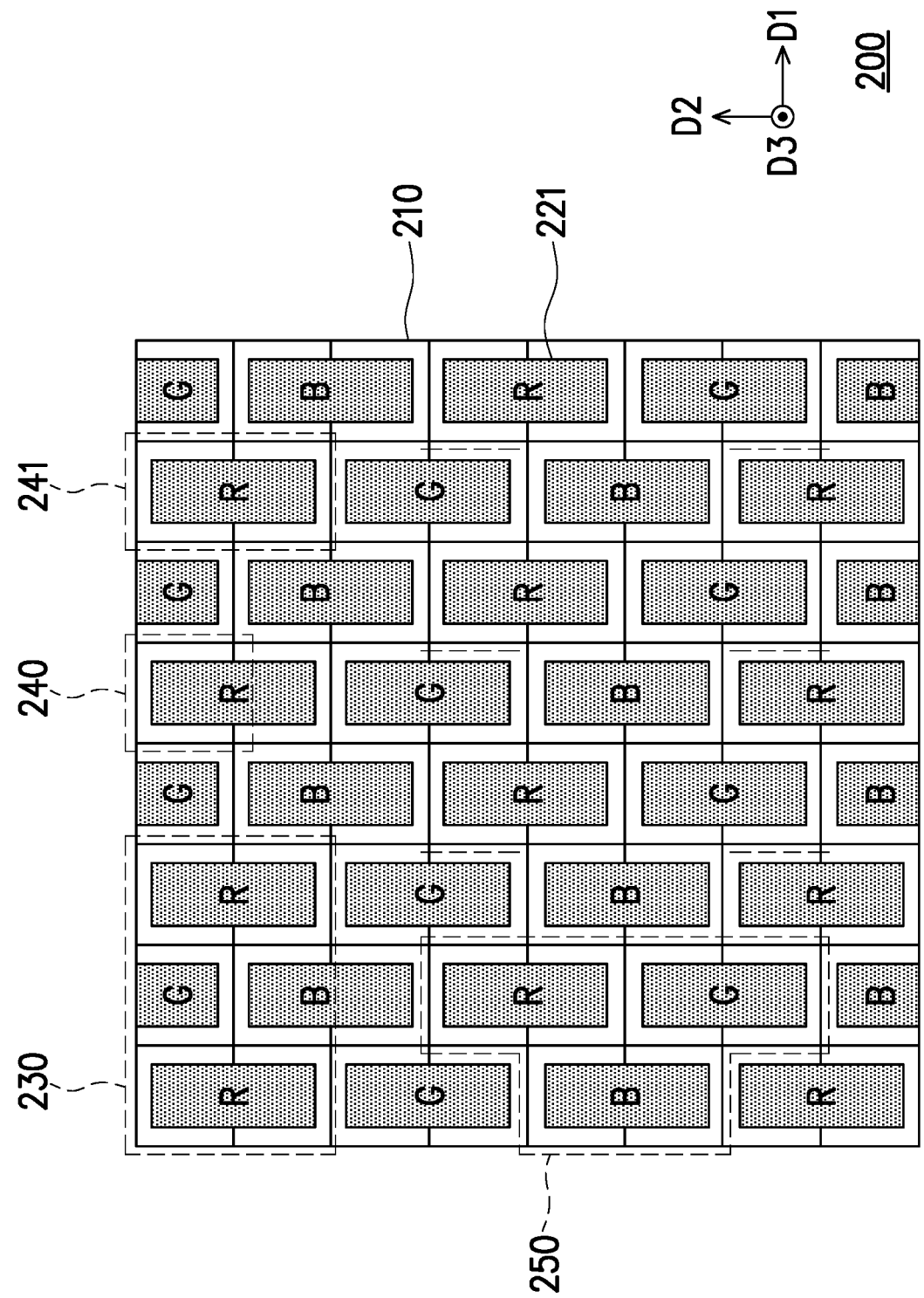
FIG. 2A is a top view illustrating a color filter module according to an embodiment of the disclosure.

FIG. 2A is a top view illustrating a color filter module according to an embodiment of the disclosure. For the convenience of the description, some components are omitted in FIG. 2A. In the following, the detailed structure of the color filter module 200 is described with reference to FIG. 2A.

Referring to FIG. 2A, the color filter module 200 may include the transparent substrate 210 and the color resist layer 220. In the embodiment, the color resist layer 220 may be arranged on the transparent substrate 210 along the third direction D3, and the color resist layer 220 includes multiple color resist units 221 arranged into an array along the first direction D1 and the second direction D2. In the embodiment, the transparent substrate 210 may include multiple pixel regions 230, and each of the pixel regions 230 may include multiple sub-pixel regions 240. In the embodiment, the sub-pixel regions 240 may be arranged in two-by-three arrangement (i.e., two rows, three columns) to form the pixel region 230. In an embodiment, the sub-pixel regions 240 may be arranged in one-by-three, two-by-two, or three-by-three arrangement to form the pixel region 230. The disclosure is not particularly limited in this regard. In the embodiment, the multiple color resist units 221 are respectively labeled with R indicating red, G indicating green, and B indicating blue. However, such arrangement and labels of the color resist units shown herein merely serve as an example, and the disclosure is not particularly limited in this regard.

In the embodiment, multiple color resist units 221 of different colors, such as color resist units of red, green, and blue, may be arranged on each pixel region 230. However, the disclosure is not particularly limited in this regard. In the embodiment, each of the color resist units 221 may be arranged across two consecutive sub-pixel regions 240. In addition, the two consecutive sub-pixel regions 240 form a color sub-pixel region 241. In an embodiment, each of the color resist units 221 may be arranged on three consecutive sub-pixel regions 240, and the three consecutive sub-pixel regions 240 form one color sub-pixel region 421. The disclosure does not intend to impose a limitation on the quantity of the sub-pixel regions 240 in the color sub-pixel region 241. In addition, the sub-pixel regions 240 in FIG. 2A may be arranged in correspondence with the electrophoretic display medium 121 shown in FIG. 1, such as being arranged in a one-to-one, multi-to-one, one-to-multi, or multi-to-multi relationship. The disclosure is not particularly limited on this regard.

In addition, as shown in FIG. 2A, the multiple color resist units 221 may form a staggered array on the transparent substrate 210, thereby forming the color resist layer 220 with a staggered pattern. Specifically, the multiple color resist units 221 in each column of the staggered array are arranged to be staggered with respect to the multiple resist units 221 in the adjacent column. In other words, each column extends in the second direction D2, and two color resist units 221 adjacent in the first direction D1 in the respective columns are arranged to be staggered in the second direction D2. In addition, the distance in which the two adjacent color resist units 221 are staggered may be set in accordance with design needs, and the disclosure is not particularly limited in this regard. Details about the staggered arrangement will be described in the following with reference to FIG. 2B.

Figure 2B:
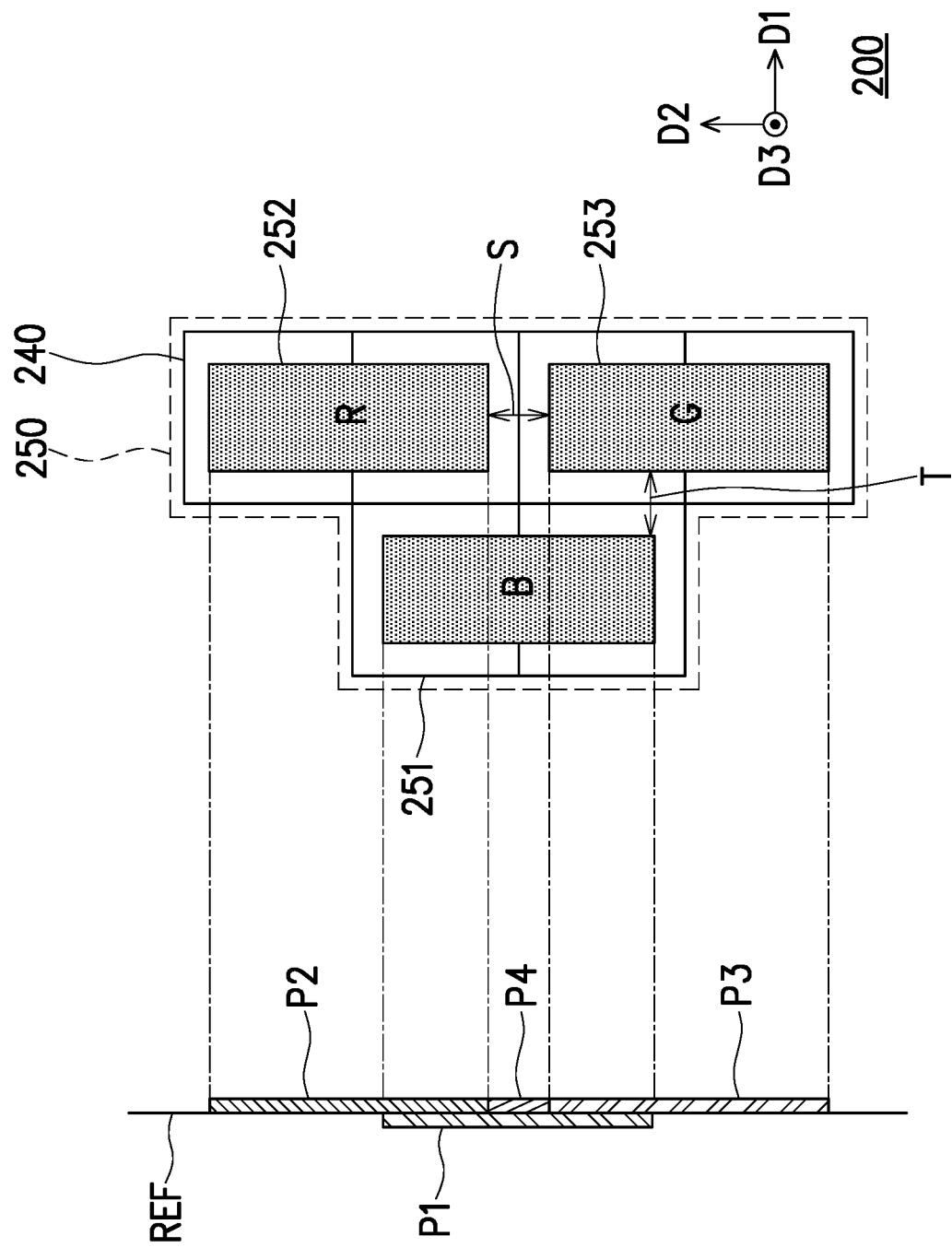
FIG. 2B is a top view illustrating a repeating unit according to an embodiment of the disclosure.

FIG. 2B is a top view illustrating a repeating unit according to an embodiment of the disclosure. Referring to FIGS. 2A and 2B, the multiple color resist units 221 (e.g., a first color resist unit 251, a second color resist unit 252, and a third color resist unit 253 in FIG. 2B) may form a repeating unit 250, and the staggered array may be formed by multiple repeating units 250 in staggered arrangement. Specifically, the first color resist unit 251 is adjacent to the second color resist unit 252 and the third color resist unit 253 in the first direction D1. In addition, the first color resist unit 251 is in staggered arrangement with the second color resist unit 252 and the third color resist unit 253 in the second direction D2. As shown in FIG. 2B, a reference axis REF extends in the column direction (i.e., the first direction DD. A projection P1 of the first color resist unit 251 on the reference axis REF is overlapped with a projection P2 of the second color resist unit 252 and a projection P3 of the third color resist unit 253 in the adjacent column. In addition, the projection P1 of the first color resist unit 251 on the reference axis REF is overlapped with a projection P4 of a spacing region (a region indicated by a spacing distance S) between the second color resist unit 252 and the third color resist unit 253.

The spacing distance S between the second color resist unit 252 and the third color resist unit 253 may be greater than or equal to one-tenth of the length of a side of one sub-pixel region 240. In an embodiment, the spacing distance S may also be greater than or equal to one-fifth of the length of a side of one sub-pixel region 240 to further suppress the color mixing phenomenon when the user views at an inclined angle. Nevertheless, the spacing distance S may be set based on the needs for a viewing angle, and the disclosure is not particularly limited in this regard. In addition, the first color resist unit 251, the second color resist unit 252, and the third color resist unit 253 may be of different colors. In addition, the first color resist unit 251, the second color resist unit 252, and the third color resist unit 253 may respectively be red, green, and blue. However, the disclosure is not limited thereto. In addition, the shapes of the multiple color resist units 221 (i.e., the first color resist unit 251, the second color resist unit 252, and the third color resist unit 253) may be rectangular. However, the disclosure is not limited thereto. Moreover, the area of each of the multiple color resist units 221 (i.e., the first color resist unit 251, the second color resist unit 252, and the third color resist unit 253) is smaller than a sum of the areas of the at least two sub-pixel regions 240 across which the color resist unit 221 is arranged.

Figure 3B:
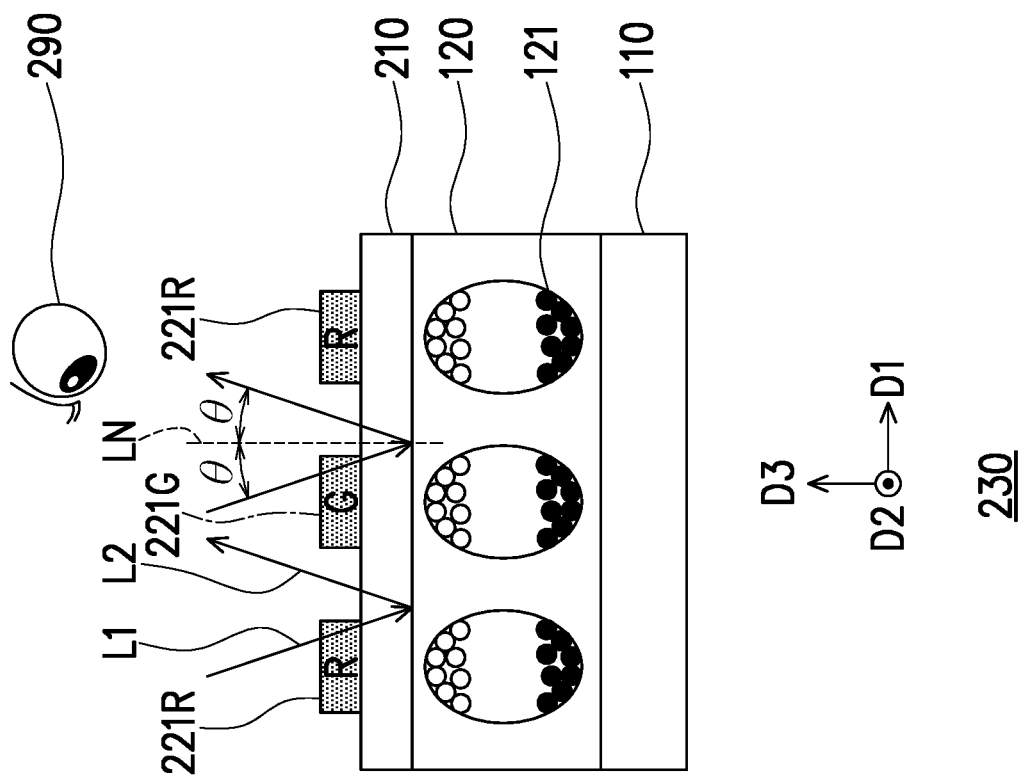
FIG. 3B is a partial cross-sectional view illustrating the pixel region of FIG. 3A along a cross-section 1-1'.
Figure 3A:
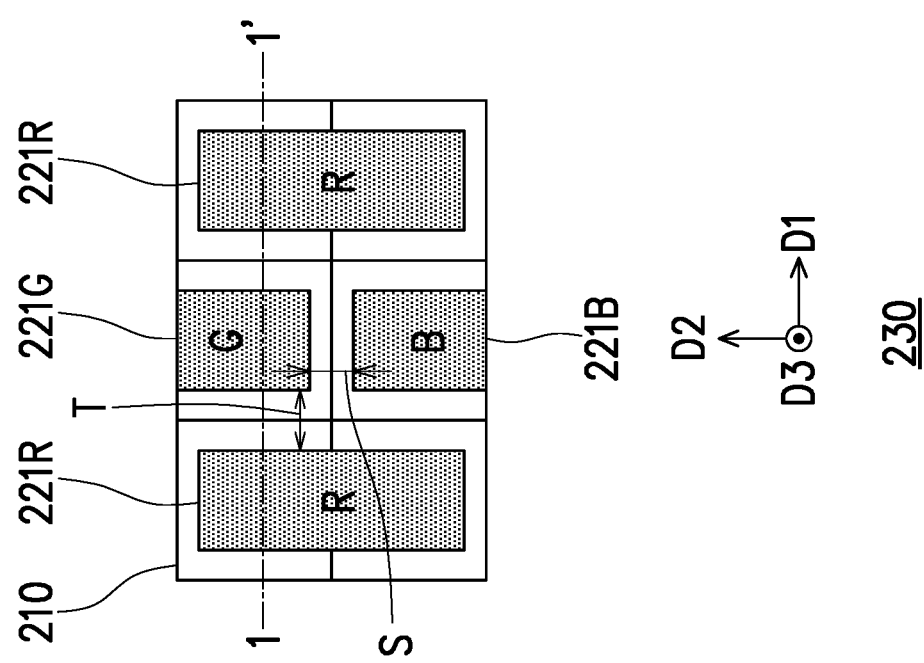
FIG. 3A is a top view illustrating a pixel region according to an embodiment of the disclosure.

FIG. 3A is a top view illustrating a pixel region according to an embodiment of the disclosure. Referring to FIGS. 2A and 3A, each pixel region 230 may include multiple sub-pixel regions 240. In the embodiment, the sub-pixel regions 240 may be arranged in two-by-three arrangement (i.e., two rows, three columns) to form the pixel region 230. In other words, each pixel region 230 may include six sub-pixel regions 240. However, in an embodiment not shown herein, the sub-pixel regions 240 may be arranged in one-by-three, two-by-two, or three-by-three arrangement to form the pixel region 230. The disclosure is not particularly limited in this regard. In the embodiment, in the three columns along the first direction D1, the pixel region 230 is sequentially provided with one red color resist unit 221R, a half of one green color resist unit 221G, a half of one blue color resist unit 221B, and one red color resist unit 221R. However, the disclosure is not limited thereto. In addition, the spacing distance S is provided between the half of the green color resist unit 221G and the half of the blue color resist unit 221B in the second direction D2, and a spacing distance T is provided between the red color resist unit 221R and the green color resist unit 221G or between the red color resist unit 221R and the blue color resist unit 221B adjacent in the first direction D1. In the embodiment, the spacing distance S and the spacing distance T may be set to be the same or different distances according to the design needs. The disclosure is not particularly limited in this regard.

A cross-section 1-1' of the pixel region 230 is labeled in FIG. 3A. In addition, the cross-section 1-1' of the pixel region 230 is taken sequentially through the red color resist unit 221R, the green color resist unit 221G, and the red color resist unit 221R along the first direction D1. In the following, the cross-section 1-1' of the pixel region 230 will be described in detail with reference to FIG. 3B.

FIG. 3B is a partial cross-sectional view illustrating the pixel region of FIG. 3A along a cross-section 1-1'. Referring to FIGS. 2A, 3A, and 3B, when an incident light L1 is incident to the sub-pixel region 240, the incident light L1 is reflected to form a reflected light L2. In addition, with the design of the color resist unit 221, the reflected light L2 may display a color corresponding to the color resist unit 221. In addition, depending on the driving condition of the electrophoretic display medium 121, the sub-pixel region 240 may display a specific color. For example, the red color resist unit 221R is arranged on the sub-pixel region 240. In a normal environment, if light on the path on which the incident light L1 is reflected to form the reflected light L2 passes through the red color resist unit 221R, the reflected light L2 may be red. Similarly, if light on the path on which the incident light L1 is reflected to form the reflected light L2 passes through the green color resist unit 221G, the reflected light L2 may be in green. Similarly, if light on the path on which the incident light L1 is reflected to form the reflected light L2 passes through the blue color resist unit 221B, the reflected light L2 may be in blue. Thus, by mixing the colors of the multiple sub-pixel regions 240, the corresponding pixel region 230 may exhibit different colors. In the embodiment, the incident light L1 may include ambient light or a light source provided by an electronic product capable of emitting light. The disclosure is not particularly limited in this regard.

Since the spacing distance T is provided between the red color resist unit 221R and the green color resist unit 221G adjacent in the first direction D1, the chance that the path on which the incident light L1 is formed into the reflected light L2 passes through the red color resist unit 221R as well as the green color resist unit 221G is reduced. Specifically, as shown in FIG. 3B, a normal line LN is perpendicular to the transparent substrate 210. In addition, an angle $\theta$ is set between the normal line N and the incident light L1 or the reflected light L2. That is, the angle $\theta$ may represent the incident angle of the incident light L1 or the reflection angle of the reflected light L2. The angle $\theta$ may also represent the viewing angle when the user views the electrophoretic display 100 with an eye 290. As shown in FIG. 3B, under the condition that the spacing distance T is provided, when the viewing angle (i.e., the angle $\theta$) at which the user views the electrophoretic display 100 is inclined within a certain range, the user may only view the reflected light L2 passing through the red color resist unit 221R or the green color resist unit 221G only. In other words, the image viewed by the user at a viewing angle that is a more inclined angle $\theta$ is not affected by the color mixing phenomenon, and the user experience of the electrophoretic display 100 is therefore enhanced.

Besides, similar to the case of the spacing distance T, the spacing distance S provided between the green color resist unit 221G and the blue color resist unit 221B adjacent in the first direction D1 is also able to effectively reduce the chance that the path on which the incident light L1 is formed into the reflected light L2 passes through color resist units 221 of different colors. Thus, the image viewed by the user at a viewing angle that is a more inclined angle $\theta$ is not affected by the color mixing phenomenon, and the user experience of the electrophoretic display 100 is therefore enhanced.

Figure 4B:
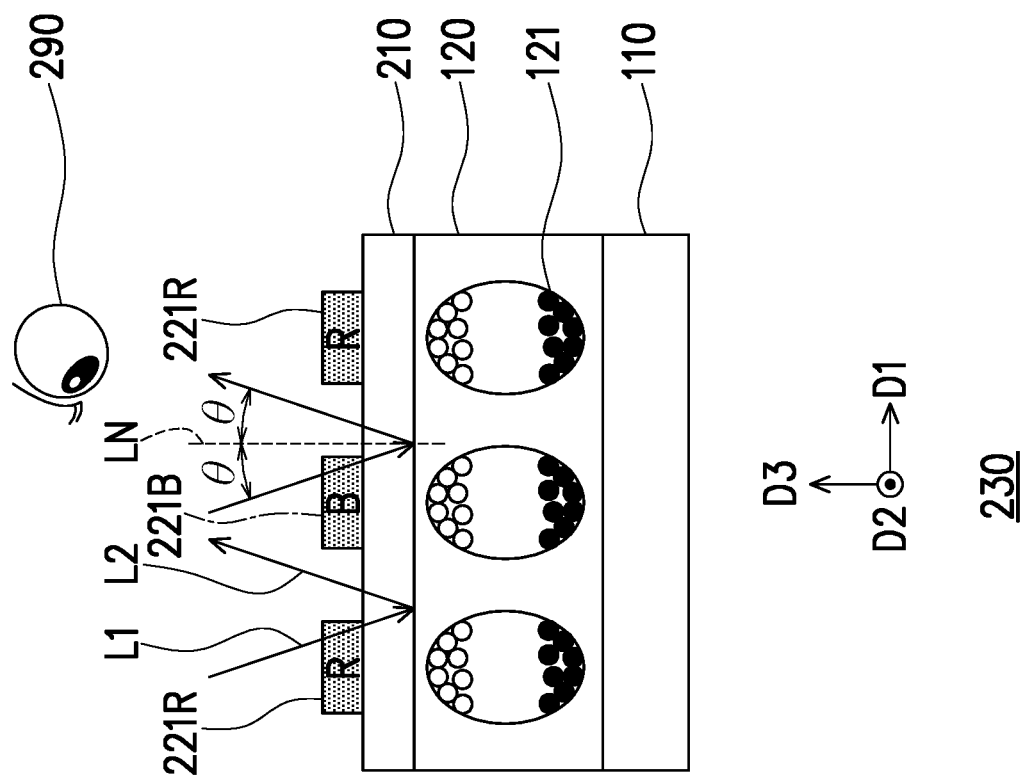
FIG. 4B is a partial cross-sectional view illustrating the pixel region of FIG. 4A along a cross-section 2-2'.
Figure 4A:
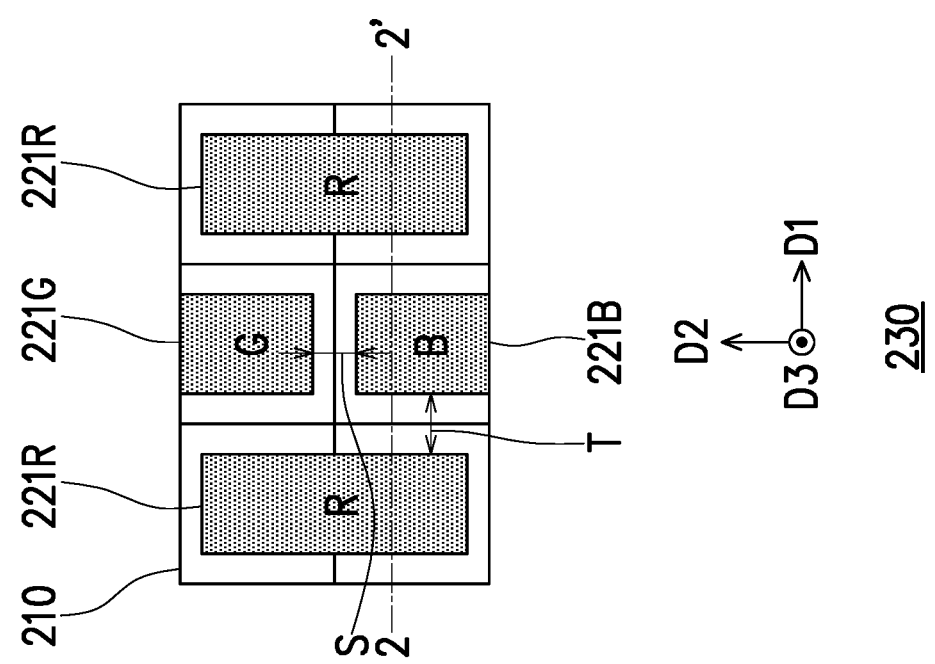
FIG. 4A is a top view illustrating a pixel region according to an embodiment of the disclosure.

FIG. 4A is a top view illustrating a pixel region according to an embodiment of the disclosure. Referring to FIGS. 2A, 3A, and 4A, the difference between FIGS. 3A and 4A lies in that a cross-section 2-2' of the pixel region 230 is labeled in FIG. 4A. In addition, the cross-section 2-2' of the pixel region 230 is taken sequentially through the red color resist unit 221R, the blue color resist unit 221B, and the red color resist unit 221R along the first direction D1. In the following, the cross-section 2-2' of the pixel region 230 will be described in detail with reference to FIG. 4B.

FIG. 4B is a partial cross-sectional view illustrating the pixel region of FIG. 4A along a cross-section 2-2'. Referring to FIGS. 2A, 4A, and 4B, when the incident light L1 is incident to the sub-pixel region 240, the incident light L1 is reflected to form the reflected light L2. Since the spacing distance T is provided between the red color resist unit 221R and the blue color resist unit 221B adjacent in the first direction D1, the chance that the path on which the incident light L1 is formed into the reflected light L2 passes through the red color resist unit 221R as well as the blue color resist unit 221B is reduced. Specifically, as shown in FIG. 3B, the normal line LN is perpendicular to the transparent substrate 210. In addition, the angle θ is set between the normal line N and the incident light L1 or the reflected light L2. That is, the angle θ may represent the incident angle of the incident light L1 or the reflection angle of the reflected light L2. The angle θ may also represent the viewing angle when the user views the electrophoretic display 100 with the eye 290. As shown in FIG. 4B, under the condition that the spacing distance T is provided, when the viewing angle (i.e., the angle θ) at which the user views the electrophoretic display 100 is inclined within a certain range, the user may only view the reflected light L2 passing through the red color resist unit 221R or the blue color resist unit 221B only. In other words, the image viewed by the user at a viewing angle that is a more inclined angle θ is not affected by the color mixing phenomenon, and the user experience of the electrophoretic display 100 is therefore enhanced.

Figure 5B:
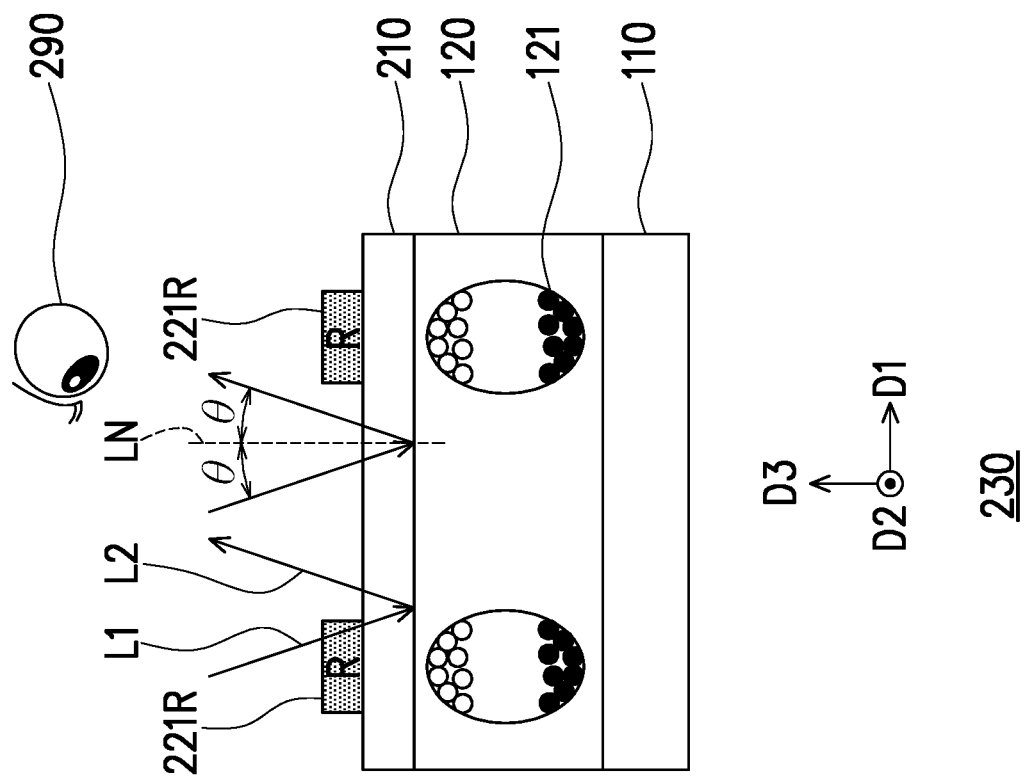
FIG. 5B is a partial cross-sectional view illustrating the pixel region of FIG. 5A along a cross-section 3-3'.
Figure 5A:
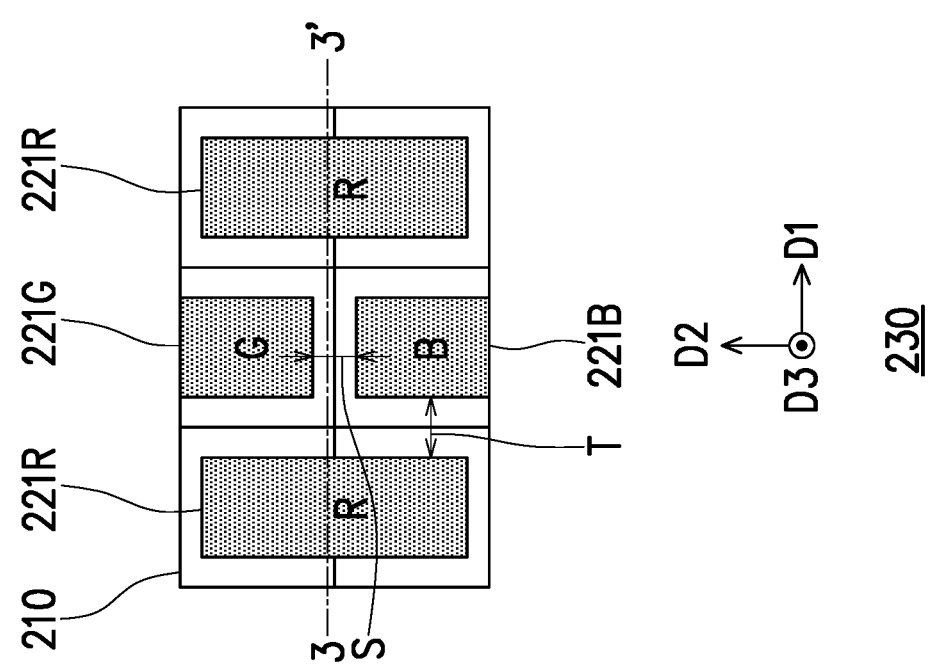
FIG. 5A is a top view illustrating a pixel region according to an embodiment of the disclosure.

FIG. 5A is a top view illustrating a pixel region according to an embodiment of the disclosure. Referring to FIGS. 2A, 3A, and 5A, the difference between FIGS. 3A and 5A lies in that a cross-section 3-3' of the pixel region 230 is labeled in FIG. 5A. In addition, in the cross-section 3-3' of the pixel region 230, the red resist units 221R are sequentially provided in the first and third columns along the first direction D1, and the second column in the first direction D1 is not provided with any color resist unit 221. In the following, the cross-section 3-3' of the pixel region 230 will be described in detail with reference to FIG. 5B.

FIG. 5B is a partial cross-sectional view illustrating the pixel region of FIG. 5A along a cross-section 3-3'. Referring to FIGS. 2A, 5A, and 5B, when the incident light L1 is incident to the sub-pixel region 240, the incident light L1 is reflected to form the reflected light L2. Since only the first and third columns along the first direction D1 are provided with the red color resist units 221R in the cross-section 3-3' of the pixel region, the chance that the path on which the incident light L1 is formed into the reflected light L2 passes through color resist units 221 of different colors is reduced. Specifically, as shown in FIG. 5B, the normal line LN is perpendicular to the transparent substrate 210. In addition, the angle θ is set between the normal line N and the incident light L1 or the reflected light L2. That is, the angle θ may represent the incident angle of the incident light L1 or the reflection angle of the reflected light L2. The angle θ may also represent the viewing angle when the user views the electrophoretic display 100 with the eye 290. As shown in FIG. 5B, under the condition that only the second column along the first direction D1 in the cross-section 3-3' of the pixel region 230 is not provided with any color resist unit 221, the user may only see the reflected light L2 passing through the red color resist unit 221R, regardless of how the viewing angle (i.e., the angle θ) is inclined when the user views the electrophoretic display 100. In other words, the image viewed by the user at a viewing angle that is a more inclined angle θ is not affected by the color mixing phenomenon, and the user experience of the electrophoretic display 100 is therefore enhanced.

In view of the foregoing, with the color resist units being arranged in a staggered array in the color filter module according to the embodiments of the disclosure, the chance that the path on which the incident light is formed into the reflected light passes through color resist units of different colors is able to be effectively reduced. In this way, the image viewed by the user at a more inclined viewing angle is not affected by the color mixing phenomenon. Thus, the electrophoretic display device having the color filter module according to the disclosure is able to provide favorable viewing experiences.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A color filter module, arranged on a display panel, the color filter module comprising:
    a transparent substrate, comprising a plurality of sub-pixel regions arranged in an array; and
    a color resist layer, arranged on the transparent substrate, and comprising a plurality of color resist units, wherein each of the color resist units is respectively arranged across at least two consecutive sub-pixel regions, and the color resist units form a staggered array on the transparent substrate, and each of the color resist units displays a specific color,
    wherein, among the color resist units, color resist units in each column of the staggered array are arranged to be staggered with color resist units in an adjacent column, and
    a projection of a first color resist unit in the each column on a reference axis is overlapped with projections of a second color resist unit and a third color resist unit in the adjacent column, and the reference axis extends along a column direction.

2. The color filter module as claimed in claim 1, wherein the projection of the first color resist unit on the reference axis is overlapped with a projection of a spacing region between the second color resist unit and the third color resist unit.

3. The color filter module as claimed in claim 2, wherein a spacing distance between the second color resist unit and the third color resist unit is greater than or equal to one-tenth of a length of a side of the sub-pixel region.

4. The color filter module as claimed in claim 1, wherein the first color resist unit, the second color resist unit, and the third color resist unit form a repeating unit, and the staggered array is formed by a plurality of repeating units in staggered arrangement.

5. The color filter module as claimed in claim 1, wherein the first color resist unit, the second color resist unit, and the third color resist unit are of different colors.

6. The color filter module as claimed in claim 1, wherein the first color resist unit, the second color resist unit, and the third color resist unit are respectively red, green, and blue.

7. The color filter module as claimed in claim 1, wherein shapes of the color resist units are rectangular.

8. The color filter module as claimed in claim 1, wherein an area of each of the color resist units is smaller than a sum of areas of the at least two sub-pixel regions across which the each of the color resist units is arranged.

9. A color filter module, arranged on a display panel with a plurality of electrophoretic display media, wherein the color filter module comprising:

a transparent substrate, comprising a plurality of sub-pixel regions arranged in an array; and a color resist layer, arranged on the transparent substrate, and comprising a plurality of color resist units, wherein each of the color resist units is respectively arranged across at least two consecutive sub-pixel regions, and the color resist units form a staggered array on the transparent substrate, and each of the color resist units displays a specific color, wherein, among the color resist units, color resist units in each column of the staggered array are arranged to be staggered with color resist units in an adjacent column, and a projection of a first color resist unit in the each column on a reference axis is overlapped with projections of a second color resist unit and a third color resist unit in the adjacent column, and the reference axis extends along a column direction, wherein each one of the plurality of color resist units is directly arranged above at least one electrophoretic display medium.

\* \* \* \* \*